(12) United States Patent
Hashimoto (10) Patent No.: US 11,520,495 B2
(45) Date of Patent: Dec. 6, 2022

(54) INFORMATION PROCESSING APPARATUS AND CONTROL METHOD FOR INFORMATION PROCESSING APPARATUS

(71) Applicant: CANON KABUSHIKI KAISHA, Tokyo (JP)

(72) Inventor: Minoru Hashimoto, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/938,410

(22) Filed: Jul. 24, 2020

(65) Prior Publication Data

US 2021/0064255 A1 Mar. 4, 2021

(30) Foreign Application Priority Data

Aug. 28, 2019 (JP) ............................. JP2019-155430

(51) Int. Cl.
*G06F 3/06* (2006.01)

(52) U.S. Cl.
CPC .......... *G06F 3/0625* (2013.01); *G06F 3/0655* (2013.01); *G06F 3/0679* (2013.01)

(58) Field of Classification Search
CPC ..... G06F 3/0625; G06F 3/0655; G06F 3/0679
See application file for complete search history.

(56) References Cited

U.S. PATENT DOCUMENTS

| | | | | |
|---|---|---|---|---|
| 6,236,850 B1 * | 5/2001 | Desai | ................ | H04W 52/0225 455/574 |
| 7,443,627 B1 * | 10/2008 | Krishnamoorthy | .. | G11B 25/043 360/69 |
| 9,417,810 B1 * | 8/2016 | Dang | ..................... | G06F 1/3225 |
| 10,747,163 B2 * | 8/2020 | Kawajiri | ............ | G03G 15/5004 |
| 2004/0036995 A1 * | 2/2004 | Suzuki | ..................... | G06F 1/184 360/69 |
| 2004/0236908 A1 * | 11/2004 | Suzuki | ................. | G11B 33/144 711/114 |
| 2008/0080131 A1 * | 4/2008 | Hori | ..................... | G06F 3/0689 361/679.31 |
| 2008/0201593 A1 * | 8/2008 | Hori | ..................... | G06F 1/3203 713/324 |
| 2010/0033751 A1 * | 2/2010 | Kitamura | ........... | H04N 1/00885 358/1.14 |
| 2011/0060867 A1 * | 3/2011 | Jung | ..................... | G06F 3/0658 711/103 |
| 2011/0099339 A1 * | 4/2011 | Hagiwara | ............. | G06F 1/3287 711/154 |
| 2013/0311696 A1 * | 11/2013 | Huff | ..................... | G06F 13/385 710/316 |

(Continued)

FOREIGN PATENT DOCUMENTS

JP 2013-250616 A 12/2013

*Primary Examiner* — Prasith Thammavong
(74) *Attorney, Agent, or Firm* — Canon U.S.A., Inc. IP Division (57) ABSTRACT

An image forming apparatus includes a solid state drive (SSD) that stores information, a Serial Advanced Technology Attachment (SATA) controller that reads information from the SSD, writes information to the SSD, and transmits a device sleep (DEVSLP) signal for shifting the SSD to a DEVSLP state, and a power source control unit that can stop power to the SATA controller and transmits the DEVSLP signal for shifting the SSD to the DEVSLP state during a period in which the power to the SATA controller is stopped.

31 Claims, 5 Drawing Sheets

(56) References Cited

U.S. PATENT DOCUMENTS

| | | | |
|---|---|---|---|
| 2014/0207996 A1* | 7/2014 | Fisher | G06F 3/0685 |
| | | | 711/103 |
| 2014/0281600 A1* | 9/2014 | Wells | G06F 3/0634 |
| | | | 713/320 |
| 2014/0316602 A1* | 10/2014 | Kawai | G05B 19/41865 |
| | | | 700/297 |
| 2016/0062775 A1* | 3/2016 | Yoshihara | G06F 1/325 |
| | | | 713/2 |
| 2017/0160788 A1* | 6/2017 | Huang | G06F 1/3225 |
| 2018/0210539 A1* | 7/2018 | Hashimoto | G06F 1/3268 |
| 2019/0286219 A1* | 9/2019 | Anazawa | G06F 3/068 |
| 2020/0004311 A1* | 1/2020 | Olarig | G06F 3/0604 |

* cited by examiner

| POWER MODE | SATA CONTROLLER POWER SOURCE | SSD POWER SOURCE | CONTROL OF DEVSLP SIGNAL 504 | LEVEL OF DEVSLP SIGNAL |
|---|---|---|---|---|
| STANDBY MODE | ON | ON | SATA CONTROLLER | H or L |
| SLEEP MODE | OFF | ON | POWER SOURCE CONTROL UNIT | H |

INFORMATION PROCESSING APPARATUS AND CONTROL METHOD FOR INFORMATION PROCESSING APPARATUS

BACKGROUND

Field

The present disclosure relates to an information processing apparatus including a storage device that stores information and a control method for the information processing apparatus.

Description of the Related Art

Suppression of power consumption is an important issue for recent information processing apparatuses in order to conform to international rules such as International ENERGY STAR® program, the Blue Angel, and Energy-related Products (ErP) Directive. Many information processing apparatuses switch a power mode based on operation statuses of the apparatuses. For example, an information processing apparatus is in a standby mode in an operation time and in a sleep mode where power consumption is low in a non-operation time.

A storage device to be mounted in an information processing apparatus includes a hard disk drive (HDD) and a solid state drive (SSD). Because of cost reduction in recent years, an SSD is used in many cases as the storage device to be mounted. Some SSDs adopting a Serial Advanced Technology Attachment (SATA), which is widely used as an SSD interface, can shift to a device sleep (DEVSLP) state. A SATA controller outputs a DEVSLP signal to the SSD to put the SSD into the DEVSLP state (refer to Japanese Patent Application Laid-Open No. 2013-250616). The SSD in the DEVSLP state is in a low power state, which is comparable to a state where power supply to the SSD is stopped. In addition, a recovery time from the DEVSLP state is as short as several milliseconds to several tens of milliseconds. The SATA controller performs power saving control on the SSD using the DEVSLP signal in a standby mode where the power is supplied to the SATA controller.

In a case where the information processing apparatus is in a sleep mode, the power from a power source unit is stopped except for some devices, such as a memory. At that time, the power to the SATA controller and the SSD is stopped. In this configuration, the power is supplied to the SSD at a time of recovery from the sleep mode to the standby mode, but a recovery time from a state in which the power to the SSD is stopped to a state in which the information processing apparatus can operate can take several seconds. There is an issue that the recovery time from the sleep mode to the standby mode is prolonged. There is a method for causing the SATA controller to put the SSD into the DEVSLP state without stopping the power to the SATA controller and the SSD in the sleep mode. However, the power to the SATA controller and the SSD cannot be stopped in this method, so that power saving cannot be attained in the sleep mode.

SUMMARY

Aspects of the present disclosure are directed to an information processing apparatus capable of shortening a recovery time from a sleep mode while suppressing power consumption in the sleep mode.

According to an aspect of the present invention, an information processing apparatus includes a storage device configured to store information, a memory control unit configured to read information from the storage device, to write information to the storage device, and to transmit a signal for shifting the storage device to a predetermined power saving state, and a power control unit configured to stop power to the memory control unit and to transmit a signal for shifting the storage device to the predetermined power saving state during a period in which the power to the memory control unit is stopped.

Further features will become apparent from the following description of exemplary embodiments with reference to the attached drawings.

DESCRIPTION OF THE EMBODIMENTS

Various exemplary embodiments of the present disclosure will be described below with reference to the attached drawings. The following exemplary embodiments are not meant to limit the scope of the present disclosure as encompassed by the appended claims. Not all combinations of features described in the exemplary embodiments are essential for implementing the features of the present disclosure.

Figure 1:
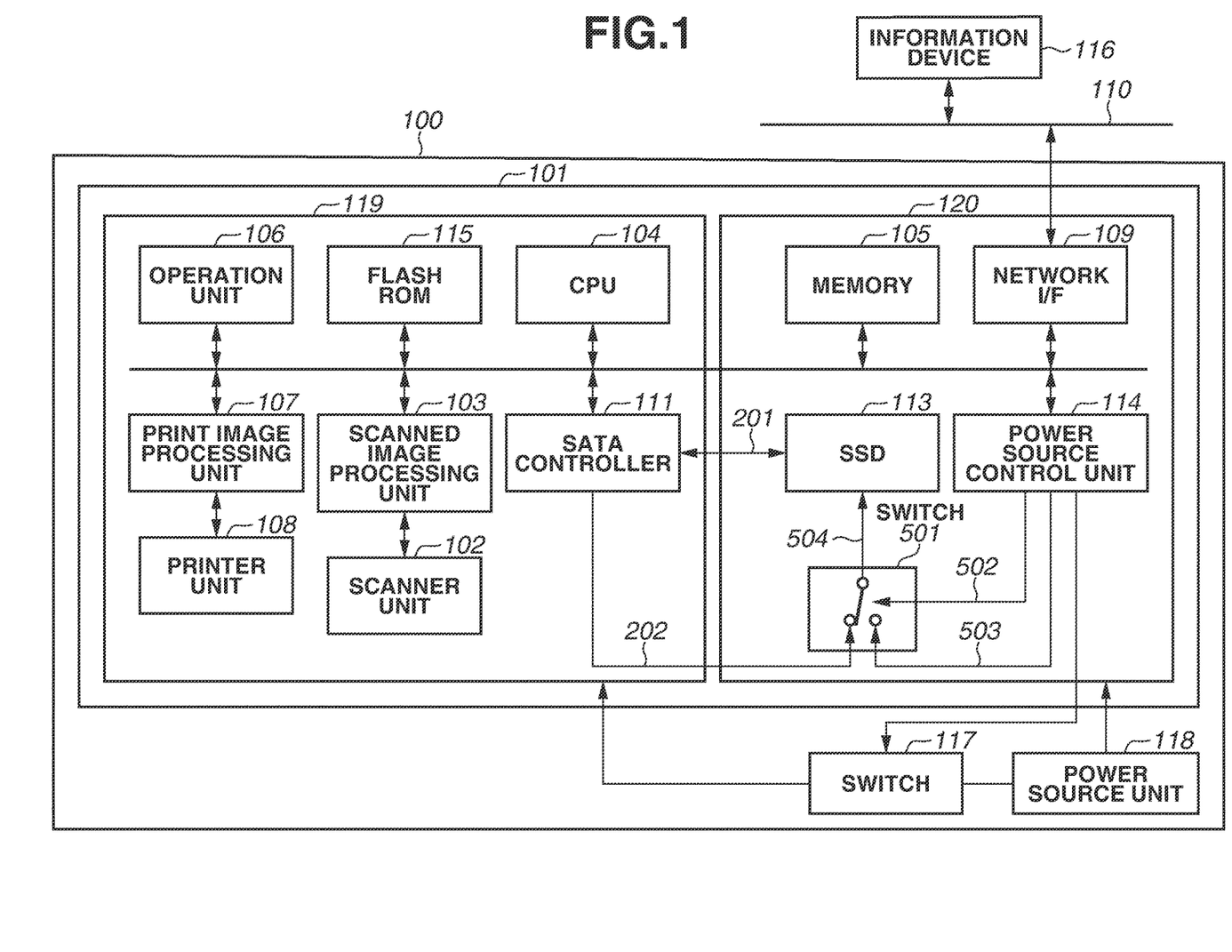
FIG. 1 is a block diagram illustrating an image forming apparatus.

FIG. 1 is a block diagram illustrating an image forming apparatus.

An image forming apparatus 100 includes a scanner unit 102, which reads an image on a document and generates image data, a printer unit 108, which prints an image on a recording medium based on the image data, and a controller 101. A network interface (I/F) 109 can communicate with an information device 116 as an external device. For example, the network I/F 109 can transmit image data generated by the scanner unit 102 to the information device 116 via a network 110. The scanner unit 102 according to the present exemplary embodiment optically reads image information on a sheet surface, converts the image information into image data as an electrical signal, and then transmits the image data to a scanned image processing unit 103. The scanned image processing unit 103 performs image processing on the image data received from the scanner unit 102 and transmits the image data to a Serial Advanced Technology Attachment (SATA) controller 111.

A main central processing unit (CPU) 104 controls the image forming apparatus 100. The main CPU 104, which includes a SATA controller compliant with the SATA standard, transmits and receives a command compliant with the SATA standard to and from the SATA controller 111. A memory (e.g., dynamic random access memory) 105 stores a control program executed by the main CPU 104. The memory 105 is used as a temporary data work area of the main CPU 104. A flash read-only memory (ROM) 115 stores a program executed by the main CPU 104 and setting information.

An operation unit 106 includes a display unit, which displays information about the image forming apparatus 100 to a user. The operation unit 106 also includes a hard key and a touch sensor for receiving an operation from a user. A print image processing unit 107 performs image processing on received image data and transmits the image data to the printer unit 108. The printer unit 108 prints the image data received from the print image processing unit 107 on a recording medium such as paper.

The network I/F 109 communicates with the information device 116 via a local area network (LAN) 110. The LAN 110 is a communication network through which the image forming apparatus 100 and the information device 116 communicate with each other. The LAN 110 can be a wired or wireless network. The information device 116 communicates with the image forming apparatus 100 via the LAN 110. The information device 116 is an information processing apparatus such as a personal computer (PC) to transmit a print job.

The information device 116 receives a scanned image transmitted by the image forming apparatus 100. The SATA controller (a memory control unit) 111, which is compliant with the SATA standard, transmits and receives a command compliant with the SATA standard to and from a peripheral device. The SATA controller 111 according to the present exemplary embodiment is a SATA-SATA bridge arranged between the main CPU 104 and a solid state drive (SSD) 113. The SATA controller 111 can communicate with the SSD 113 and the main CPU 104. The SSD 113 is a storage device including a nonvolatile semiconductor memory. The SATA controller 111 writes and reads data to and from the SSD 113.

A power source unit 118 converts an input from an alternating current power source into a direct current power source. The power source unit 118 supplies power to each unit in the image forming apparatus 100. For example, the power source unit 118 supplies the power of about 3V, about 12V, and about 24V. A switch 117 is used to supply and stop the power to a power source domain 119. The switch 117 is turned on and off based on a signal from a power source control unit (a signal transmission unit) 114. A power source domain 120 is supplied with the power from the power source unit 118 even in a case where the image forming apparatus 100 is in a sleep mode.

In a case where the image forming apparatus 100 is in a standby mode, the power source unit 118 supplies the power to the power source domain 120 and the power source domain 119. In a case where the image forming apparatus 100 is in the sleep mode, the power source unit 118 stops the power to the power source domain 119. The power source control unit 114 turns the switch 117 off, and thus, stops the power supply to the power source domain 119.

In the sleep mode, the power is only supplied to the power source domain 120. In a case where a shift condition to the sleep mode is established in a state where the image forming apparatus 100 is in the standby mode, the main CPU 104 performs shift processing to the sleep mode and stores information about an operation state in the memory 105. When the shift processing to the sleep mode is completed, the main CPU 104 notifies the power source control unit 114 of predetermined information. Upon receipt of the predetermined information, the power source control unit (a power control unit) 114 turns the switch 117 off and stops the power to the power source domain 119. The shift condition to the sleep mode is, for example, completion of a print operation, a situation where a user does not operate the operation unit 106 for a certain period of time, and an operation on a power saving button provided on the operation unit 106.

In a case where a recovery trigger to the standby mode is detected in the sleep mode, the power source control unit 114 turns the switch 117 on and supplies the power to the power source domain 119. The recovery trigger is, for example, receipt of a packet to the apparatus by the network I/F 109 and an operation on the power saving button provided on the operation unit 106. In a case where the power is supplied to the power source domain 119, the main CPU 104 restores the state of the image forming apparatus 100 based on information about the operation state stored in the memory 105 and initializes each unit to recover to the standby mode.

The image forming apparatus 100 according to the present exemplary embodiment includes a switch (a signal output unit) 501, which switches an input source of a device sleep (DEVSLP) signal for shifting the SSD 113 to the sleep mode. The sleep mode of the SSD 113 is device sleep (DEVSLP). In the DEVSLP, a power source of a physical layer (PHY) of the SSD 113 is turned off.

A DEVSLP signal 202 output by the SATA controller 111 in the standby mode is connected to one of two inputs of the switch 501. A DEVSLP signal 503 output by the power source control unit 114 in the sleep mode is connected to the other of the two inputs of the switch 501. A DEVSLP switching signal 502 (also referred to as a switch control signal 502) output by the power source control unit 114 is input to the switch 501. The DEVSLP switching signal 502 connects a terminal to which a DEVSLP signal 504 of the SSD 113 is input to the DEVSLP signal 202 or the DEVSLP signal 503.

Figure 2:
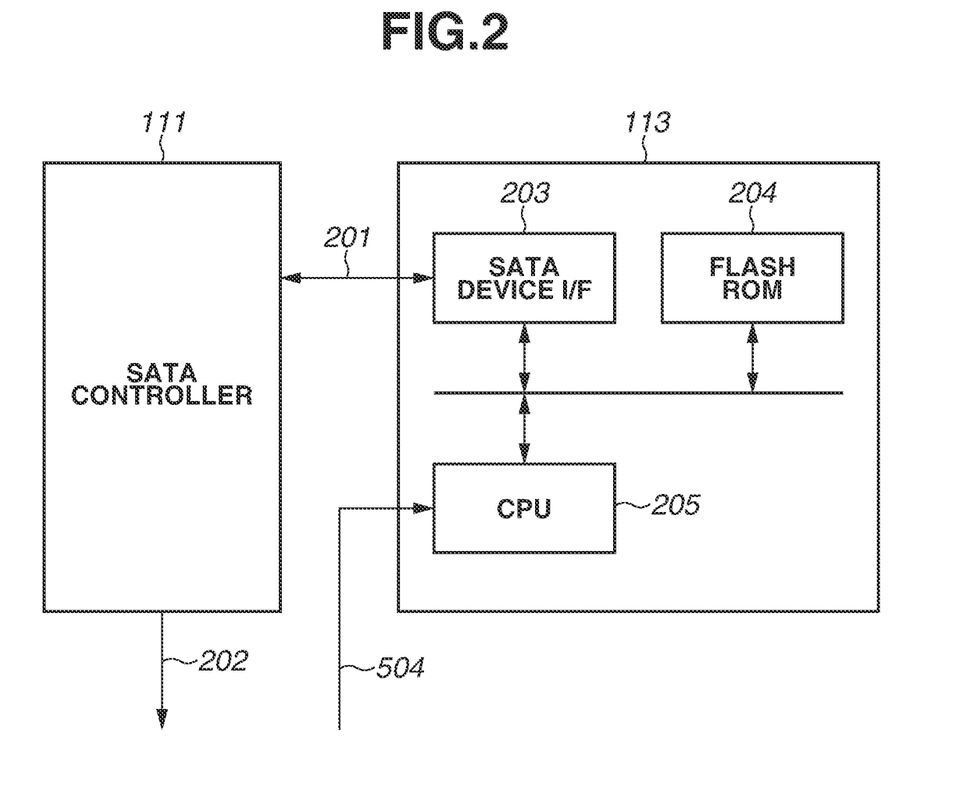
FIG. 2 is a block diagram illustrating details of a solid state drive (SSD).

FIG. 2 is a block diagram illustrating details of the SSD 113.

A SATA bus 201 is used by the SATA controller 111 to transmit and receive data to and from the SSD 113. The DEVSLP signal 504 is a signal for shifting the SSD 113 to a power saving mode. The DEVSLP signal 504 is connected to a CPU 205 in the SSD 113. The CPU 205 performs power saving control on the SSD 113. The SSD 113 includes a SATA device I/F 203 connected to the SATA bus 201, a flash ROM 204 as a storage element, and the CPU 205, which controls the flash ROM 204.

In a case where the DEVSLP signal 504 is input, the CPU 205 and the SATA device I/F 203 are put into a low power state, and the power to the flash ROM 204 is stopped. This state is regarded as a DEVSLP state (a predetermined power saving state). In the DEVSLP state, a clock to the CPU 205 can be stopped, or the power to the CPU 205 can be partially stopped. The SATA device I/F 203 is also referred to as a PHY. As long as the power consumption of the SSD 113 is low, a method for power saving can be a clock gate or a power gate. When the DEVSLP signal 504 is no longer input, the CPU 205 puts the SSD 113 into the operation state. A recovery time required from a power off state to an operable state is several hundred milliseconds to several seconds. A recovery time required from the DEVSLP state to the operable state is several tens of milliseconds.

Figure 3:
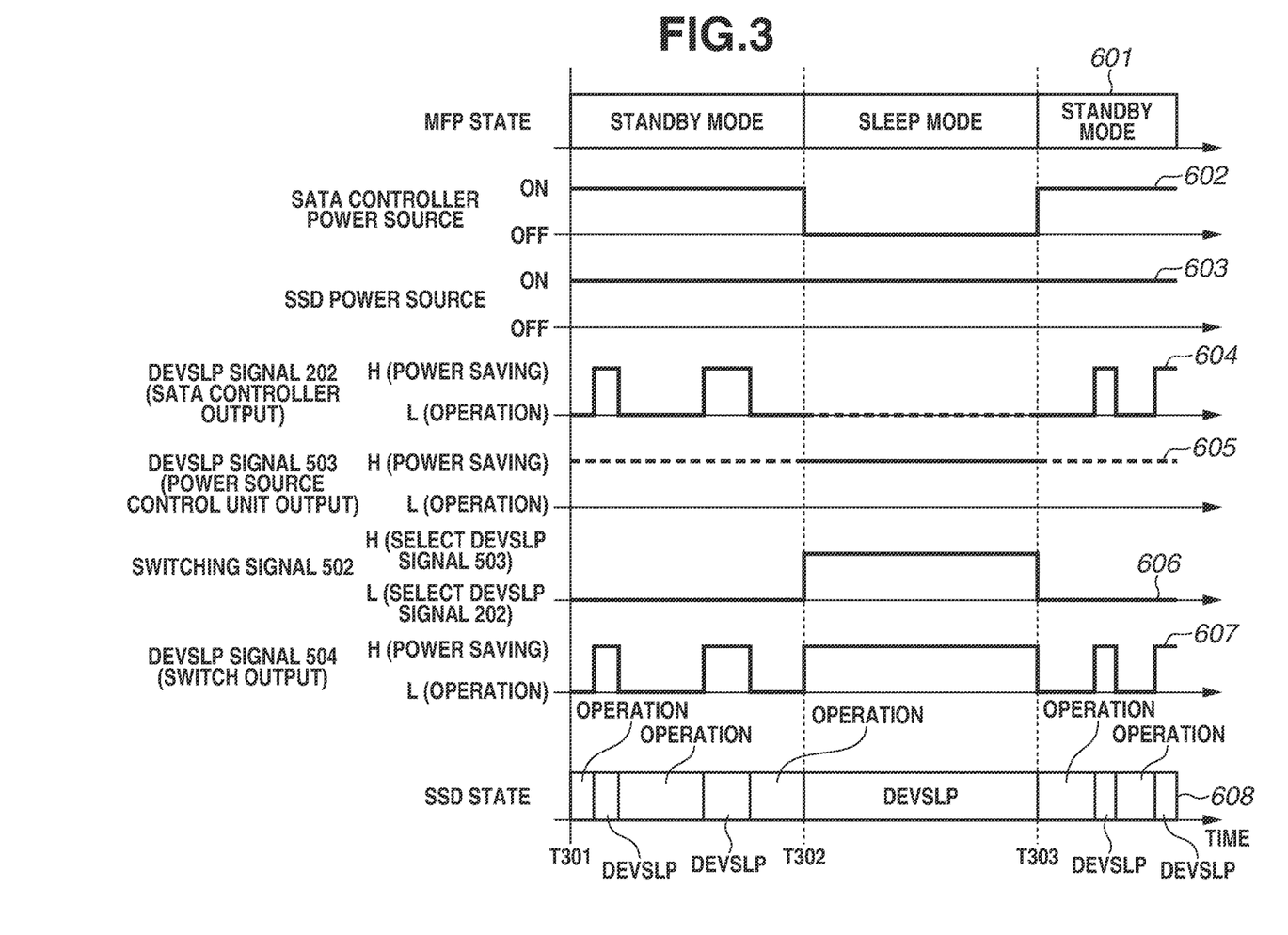
FIG. 3 is a timing chart illustrating a change in a state of the image forming apparatus.

FIG. 3 is a timing chart illustrating a change in a state of the image forming apparatus.

The image forming apparatus 100 is shifted to the standby mode, the sleep mode, and the standby mode respectively at a timing T301, a timing T302, and a timing T303. A signal 602 indicates a state of the power source of the SATA controller 111. The power to the SATA controller 111 is stopped in the standby mode (OFF in FIG. 3), and the power is supplied to the SATA controller 111 in the sleep mode (ON in FIG. 3). A signal 603 indicates a state of the power source of the SSD 113. According to the present exemplary embodiment, the power is supplied to the SSD 113 in the standby mode and the sleep mode (ON in FIG. 3). In a case where the image forming apparatus 100 is in an off mode, the power to the SSD 113 is naturally stopped.

A signal 604 indicates a state of the DEVSLP signal 202. According to the present exemplary embodiment, the SATA controller 111 puts the SSD 113 into the DEVSLP state in a case where the SSD 113 is not used in the standby mode. Accordingly, the power consumption of the SSD 113 can be reduced. Specifically, the SATA controller 111 outputs a DEVSLP signal in a case where it is determined that the SSD 113 is not used for a predetermined time (for example, ten seconds). When the DEVSLP signal is input, the SSD 113 shifts to the DEVSLP state. In a case where an access request to the SSD 113 is generated, the SATA controller 111 stops output of the DEVSLP signal and releases the DEVSLP state.

The power to the SATA controller 111 is stopped in the sleep mode, and the DEVSLP signal 202 is in a low level. In the sleep mode, the switch 501 is switched to a DEVSLP signal 503 side. The DEVSLP signal input to the SSD 113 in the sleep mode is the DEVSLP signal 503, so that the DEVSLP signal 202 in the sleep mode is indicated by a dotted line.

A signal 605 indicates a state of the DEVSLP signal 503. According to the present exemplary embodiment, the DEVSLP signal 503 is in a high level in the standby mode and the sleep mode. In the sleep mode, the switch 501 is switched to the DEVSLP signal 503 side. The DEVSLP signal to be input to the SSD 113 in the sleep mode is the DEVSLP signal 503. In the standby mode, the switch 501 is switched to a DEVSLP signal 202 side. The DEVSLP signal to be input to the SSD 113 in the standby mode is the DEVSLP signal 202, so that the DEVSLP signal 503 in the standby mode is indicated by a dotted line.

A signal 606 indicates a state of the DEVSLP switching signal 502. As described above, the DEVSLP signal 504 is connected to the DEVSLP signal 202 side in the standby mode, and is connected to the DEVSLP signal 503 side in the sleep mode. A signal 607 indicates a state of the DEVSLP signal 504. The DEVSLP signal 504 is in the same state as the DEVSLP signal 202 in the standby mode, and is in the same state as the DEVSLP signal 503 in the sleep mode. A signal 608 indicates a state of the SSD 113. According to the present exemplary embodiment, the SSD 113 is in the DEVSLP state in the sleep mode. Thus, recovery from the sleep mode to the standby mode becomes shortened.

Figure 4:
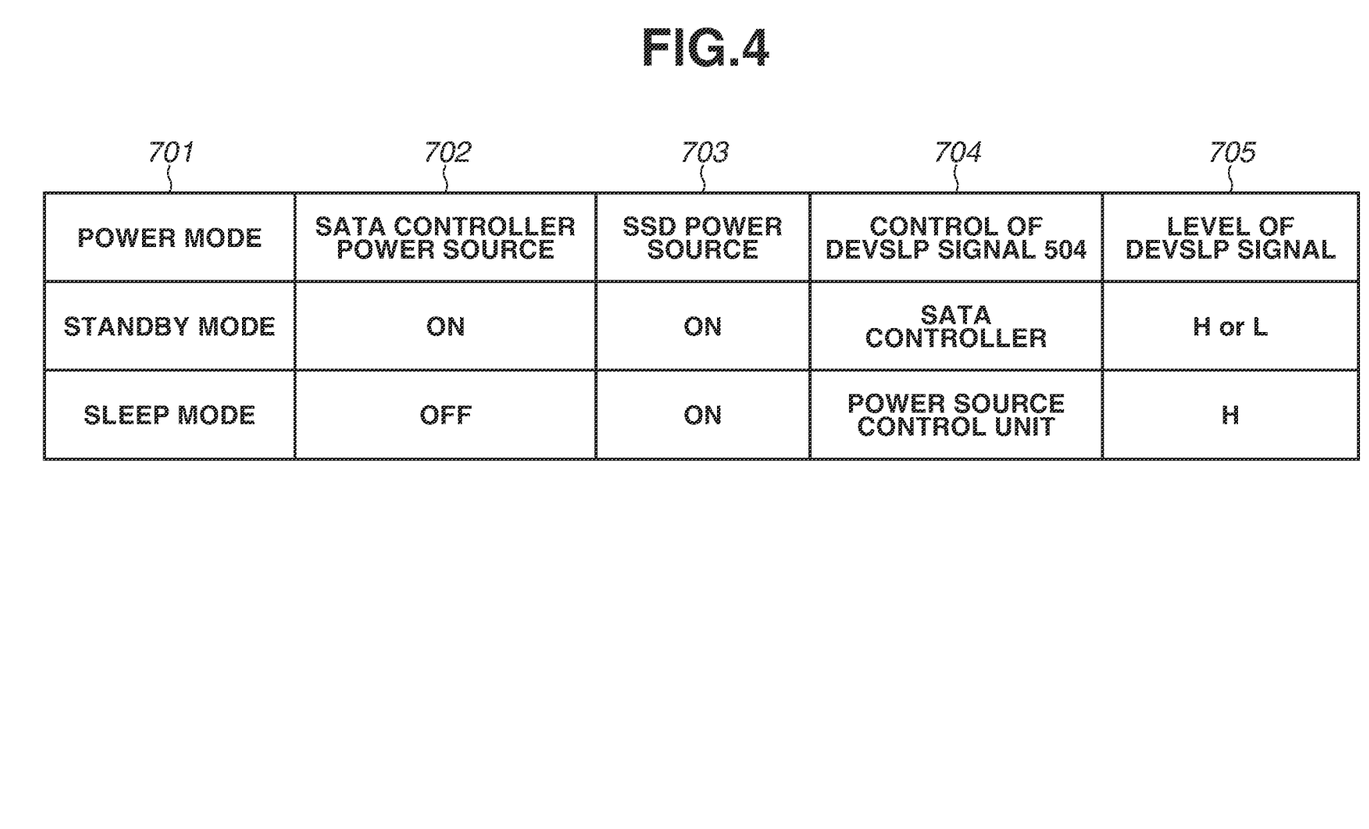
FIG. 4 is a table illustrating a state of each unit in power saving control in the image forming apparatus.

FIG. 4 is a table illustrating a state of each unit in power saving control in the image forming apparatus.

In FIG. 4, a column 701 illustrates a power mode of the image forming apparatus 100. A column 702 illustrates the state of the power source of the SATA controller 111 in each power mode. A column 703 illustrates the state of the power source of the SSD 113 in each power mode. A column 704 illustrates an entity that controls the DEVSLP signal 504 in each power mode. A column 705 illustrates a level of the DEVSLP signal 504 in each power mode.

In the standby mode, the power is supplied to the SATA controller 111 and the SSD 113, and the SATA controller 111 controls the DEVSLP signal 504. In the sleep mode, the power to the SATA controller 111 is stopped, and the power source control unit 114 controls the DEVSLP signal 504. According to the present exemplary embodiment, the DEVSLP signal 504 in the sleep mode is in a high level, but can be changed to a high level or a low level based on a predetermined condition by the power source control unit 114.

According to the present exemplary embodiment, the SSD 113 is put into the DEVSLP state by setting the DEVSLP signal 504 to a high level without stopping the power to the SSD 113 in the sleep mode. Thus, a startup time required to recover from the sleep mode to the standby mode can be shortened compared with a case in which the power to the SSD 113 is stopped in the sleep mode.

According to the present exemplary embodiment, the power source control unit 114 can control the DEVSLP signal 504 instead of the SATA controller 111 in the sleep mode, so that the power to the SATA controller 111 can be stopped in the sleep mode. Thus, the power consumption can be reduced by an amount of the power that is supposed to be supplied to the SATA controller 111 while the power supply is stopped.

Figure 5:
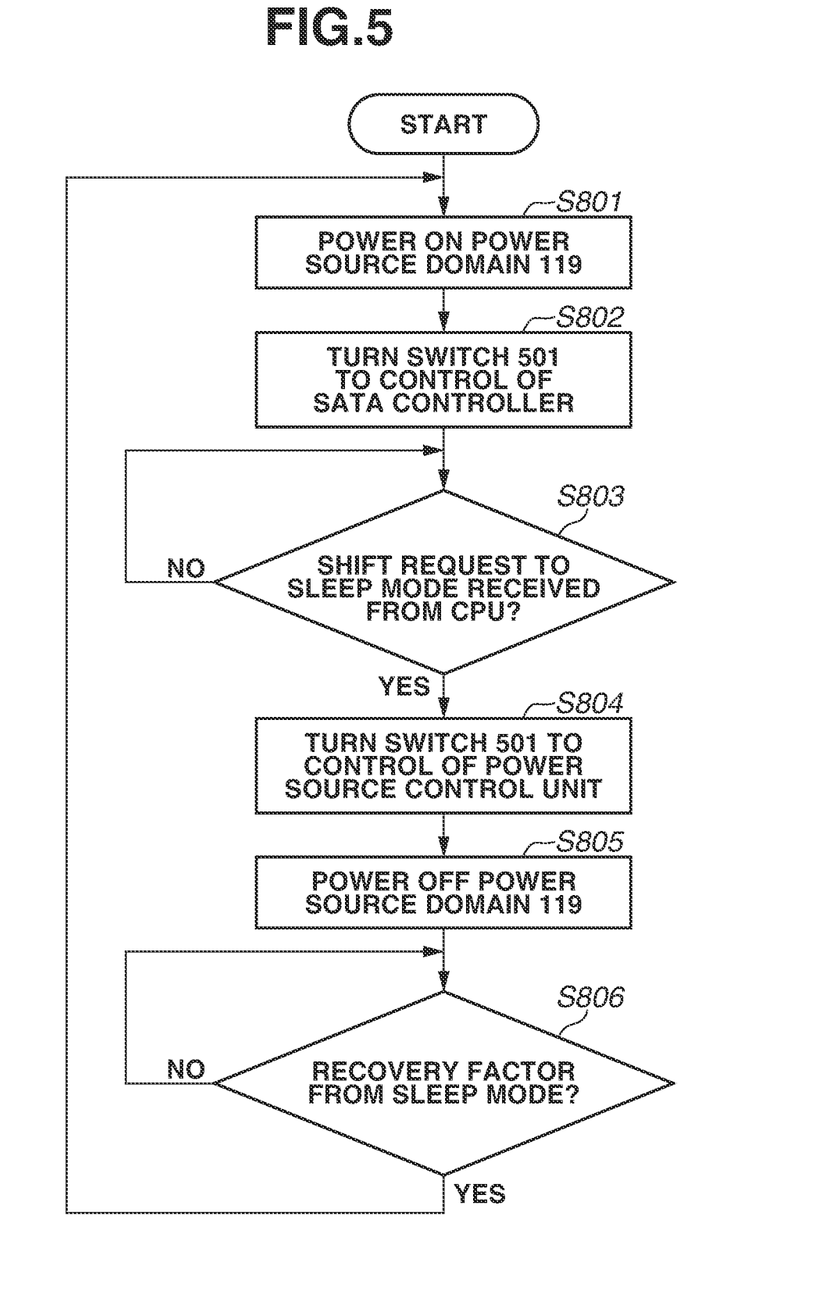
FIG. 5 is a flowchart illustrating power saving control processing by a power source control unit.

FIG. 5 is a flowchart illustrating power saving control processing by the power source control unit 114.

In a case where a power source switch of the image forming apparatus 100 is turned on, the power source unit 118 starts to output the power. The power source unit 118 supplies the power to the power source domain 120. The power source control unit 114 in the power source domain 120 is supplied with the power and then performs startup processing. When the power source control unit 114 starts, in step S801, the power source control unit 114 turns the switch 117 on and supplies the power to the power source domain 119. The main CPU 104 then starts the startup processing. In step S802, the power source control unit 114 controls the switch control signal 502 and switches the switch 501 to a side of the SATA controller 111. Thus, the DEVSLP signal 202 can be input to the SSD 113. In the standby mode, the SATA controller 111 can shift the SSD 113 to the DEVSLP state.

In a case where the main CPU 104 determines that the shift condition to the sleep mode is established, the main CPU 104 outputs a shift request to the sleep mode to the power source control unit 114. In step S803, it is determined whether the power source control unit 114 receives the shift request to the sleep mode from the main CPU 104. In a case where the power source control unit 114 receives the shift request from the main CPU 104 (YES in step S803), in step S804, the power source control unit 114 controls the switch control signal 502 to switch the switch 501 to a side of the power source control unit 114. Thus, the DEVSLP signal 503 can be input to the SSD 113. The power source control unit 114 can then shift the SSD 113 to the DEVSLP state.

In step S805, the power source control unit 114 turns the switch 117 off and stops the power to the power source domain 119. Thus, the image forming apparatus 100 shifts to the sleep mode. In the sleep mode, the power source control unit 114 fixes the DEVSLP signal 503 to the high level, and the SSD 113 is put into the DEVSLP state. In step S806, the power source control unit 114 determines whether there is a recovery factor from the sleep mode. In a case where it is determined that there is the recovery factor (YES in step S806), the power is supplied to the power source domain 119 to shift the image forming apparatus 100 to the standby mode. The power is then supplied to the main CPU 104 and the like. When input of the DEVSLP signal is stopped, the SSD 113 is recovered in several tens of milliseconds.

As described above, according to the present exemplary embodiment, the power is stopped to the SATA controller 111 but is not stopped to the SSD 113 in the sleep mode. In addition, the DEVSLP signal input to the SSD 113 is set to the high level, and the SSD 113 is put into the DEVSLP state. The present exemplary embodiment can shorten a recovery time in a case where the SSD 113 is recovered from the sleep mode to the standby mode while attaining power saving of the SSD 113 in the sleep mode.

According to the above-described exemplary embodiment, the example in which the information processing apparatus according to the present disclosure is applied to the image forming apparatus is described. The information processing apparatus according to the present disclosure is not limited to the image forming apparatus. For example, the information processing apparatus according to the present disclosure can be applied to a note PC, a tablet PC, a desktop PC, a smartphone, an automobile, an air conditioner, a game machine, a robot, and the like.

According to the above-described exemplary embodiment, the example is described in which the power source control unit 114 controls the DEVSLP signal in the sleep mode. The present disclosure is not limited to the power source control unit 114 as long as the device is included in the power source domain 120. For example, the network I/F 109 can control the DEVSLP signal in the sleep mode, or a circuit in the power source domain 120 can fix the DEVSLP signal to the high level.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2019-155430, filed Aug. 28, 2019, which is hereby incorporated by reference herein in its entirety.

What is claimed is:

1. An information processing apparatus comprising:
a storage device configured to store information;
a storage device controller configured to read information from the storage device and to write information to the storage device, wherein the storage device controller controls, during a first time period, a power state of the storage device between a power on state and a power saving state, the first time period being a period in which the information processing apparatus is in a first state, the first state being a state in which the storage device controller is being supplied with power; and
a power control unit configured to:
stop supply of power to the storage device controller without stopping supply of power to the storage device, during a second time period, wherein the second time period is a period in which the information processing apparatus is in a second state, the second state being a state in which the storage device controller is not being supplied with power; and
directly control the power state of the storage device between the power on state and the power saving state, during the second time period,
wherein the power state of the storage device is controlled by the storage device controller during the first time period and by the power control unit during the second time period.

2. The information processing apparatus according to claim 1, wherein the storage device controller transmits a signal for shifting the storage device from the power on state to the power saving state during the first time period in which power is supplied to the storage device controller.

3. The information processing apparatus according to claim 1, further comprising a signal output unit configured to receive a signal transmitted from the storage device controller and a signal transmitted from the power control unit, and to output one of these signals to the storage device.

4. The information processing apparatus according to claim 3,
wherein the signal output unit is a switch, and
wherein the power control unit transmits a switching signal to the switch, and the switch is connected so that the signal transmitted from the storage device controller is input to the storage device or so that the signal transmitted from the power control unit is input to the storage device, depending on the switching signal received from the power control unit.

5. The information processing apparatus according to claim 1, wherein the storage device controller is a Serial Advanced Technology Attachment controller.

6. The information processing apparatus according to claim 5, further comprising another Serial Advanced Technology Attachment controller configured to communicate with the Serial Advanced Technology Attachment controller,
wherein the Serial Advanced Technology Attachment controller is a Serial Advanced Technology Attachment-Serial Advanced Technology Attachment bridge that is arranged between the another Serial Advanced Technology Attachment controller and the storage device.

7. The information processing apparatus according to claim 1, wherein the storage device is a solid state drive.

8. The information processing apparatus according to claim 1, further comprising a power source unit configured to supply first power to a first power source domain including the storage device and the power control unit, and to supply second power to a second power source domain including the storage device controller,
   wherein the power control unit is able to stop the supply of power to the first power source domain and/or the second power source domain.

9. The information processing apparatus according to claim 1, further comprising a printer unit configured to print an image on a recording medium.

10. The information processing apparatus according to claim 1, further comprising a scanner unit configured to scan an image on a document.

11. The information processing apparatus according to claim 1, wherein the storage device is non-volatile drive.

12. A method for controlling an information processing apparatus including (i) a storage device configured to store information, (ii) a storage device controller configured to read information from the storage device and to write information to the storage device, wherein the storage device controller controls, during a first time period, a power state of the storage device between a power on state and a power saving state, the first time period being a period in which the information processing apparatus is in a first state, the first state being a state in which the storage device controller is being supplied with power, and (iii) a power control unit, the method comprising:
   causing the power control unit to stop supply of power to the storage device controller without stopping supply of power to the storage device, during a second time period,
   wherein the second time period is a period in which the information processing apparatus is in a second state, the second state being a state in which the storage device controller is not being supplied with power; and
   causing the power control unit to directly control the power state of the storage device between the power on state and the power saving state between the power on state and the power saving state, during the second time period,
   wherein the power state of the storage device is controlled by the storage device controller during the first time period and by the power control unit during the second time period.

13. The method according to claim 12, wherein the storage device controller transmits a signal for shifting the storage device from the power on state to the power saving state during the first time period in which power is supplied to the storage device controller.

14. The method according to claim 12, further comprising receiving a signal transmitted from the storage device controller and a signal transmitted from the power control unit, and to output one of these signals to the storage device.

15. The method according to claim 14,
   wherein the signal output unit is a switch, and
   wherein the power control unit transmits a switching signal to the switch, and the switch is connected so that the signal transmitted from the storage device controller is input to the storage device or so that the signal transmitted from the power control unit is input to the storage device, depending on the switching signal received from the power control unit.

16. The method according to claim 12, wherein the storage device controller is a Serial Advanced Technology Attachment controller.

17. The method according to claim 16,
   wherein the information processing apparatus further comprises another Serial Advanced Technology Attachment controller configured to communicate with the Serial Advanced Technology Attachment controller,
   wherein the Serial Advanced Technology Attachment controller is a Serial Advanced Technology Attachment-Serial Advanced Technology Attachment bridge that is arranged between the another Serial Advanced Technology Attachment controller and the storage device.

18. The method according to claim 12, wherein the storage device is a solid state drive.

19. The method according to claim 12, further comprising supplying first power to a first power source domain including the storage device and the power control unit, and supplying second power to a second power source domain including the storage device controller,
   wherein the power control unit is able to stop the supply of power to the first power source domain and/or the second power source domain.

20. The method according to claim 12, further comprising printing an image on a recording medium.

21. The method according to claim 12, further comprising a scanner unit configured to scan an image on a document.

22. An information processing apparatus, the information processing apparatus comprising:
   a storage device configured to store information;
   a storage device controller configured to read information from the storage device and to write information to the storage device, wherein the storage device controller controls a power state of the storage device between a power on state and a power saving state during a first time period, the first time period being a period in which the information processing apparatus is in a first state in which the storage device controller is being supplied with power;
   a power control unit configured to, during a second time period, stop supply of power to a first power source domain including the storage device, without stopping supply of power to a second power source domain including the storage device controller, wherein the second time period is a period in which the information processing apparatus is in a second state, the second state being a state in which the storage device controller is not being supplied with power; and
   a signal transmission unit included in a power source domain different from the first power source domain and configured to, during the second time period, directly control the power state of the storage device between the power on state and the power saving state,
   wherein the power state of the storage device is controlled by the storage device controller during the first time period and by the signal transmission unit during the second time period.

23. The information processing apparatus according to claim 22, wherein the storage device controller transmits a signal for shifting the storage device from the power on state to the power saving state during the first time period in which power is supplied to the first power source domain.

24. The information processing apparatus according to claim 22, further comprising a signal output unit configured to receive a signal transmitted from the storage device controller and a signal to be transmitted from the signal transmission unit and to output one of these signals to the storage device.

25. The information processing apparatus according to claim 24,
wherein the signal output unit is a switch, and
wherein the signal transmission unit transmits a switching signal to the switch, and the switch is connected so that the signal transmitted from the storage device controller is input to the storage device or so that the signal transmitted from the signal transmission unit is input to the storage device, depending on the switching signal received from the power control unit.

26. The information processing apparatus according to claim 22, wherein the storage device controller is a Serial Advanced Technology Attachment controller.

27. The information processing apparatus according to claim 26, further comprising another Serial Advanced Technology Attachment controller configured to communicate with the Serial Advanced Technology Attachment controller,
wherein the Serial Advanced Technology Attachment controller is a Serial Advanced Technology Attachment-Serial Advanced Technology Attachment bridge that is arranged between the another Serial Advanced Technology Attachment controller and the storage device.

28. The information processing apparatus according to claim 22, wherein the storage device is a solid state device.

29. The information processing apparatus according to claim 22, further comprising a power source unit configured to supply first power to the first power source domain including the storage device and to supply second power to the second power source domain including the storage device controller,
wherein the power control unit is able to stop the supply of power to the first power source domain and/or the second power source domain.

30. The information processing apparatus according to claim 22, further comprising a printer unit configured to print an image on a recording medium.

31. The information processing apparatus according to claim 22,
wherein the storage device is a non-volatile device.

* * * * *